United States Patent Office 3,787,469
Patented Jan. 22, 1974

3,787,469
POLYISOCYANATE ADDUCTS
Burns Davis and Charles J. Kibler, Kingsport, Tenn., assignors to Eastman Kodak Company, Rochester, N.Y.
No Drawing. Filed Apr. 27, 1972, Ser. No. 248,062
Int. Cl. C07c 119/04
U.S. Cl. 260—453 A    4 Claims

ABSTRACT OF THE DISCLOSURE

Polyisocyanate adducts of 1,3- and 1,4-cyclohexanebis(methylisocyanate) and an aminoalcohol having the structure

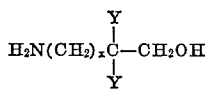

where X is 0 or 1 to 8 and Y is alkyl containing 1 to 4 carbon atoms. These polyisocyanate adducts are useful in the preparation of polyurethane coatings, adhesives, foams and elastomers.

---

This invention relates to organic polyisocyanate adducts and to a process for the preparation thereof. More specifically, this invention relates to non-volatile organic polyisocyanate adducts useful in the preparation of polyurethane coatings, adhesives, foams and elastomers.

Polyurethane coatings have been used for many years. Because of their outstanding abrasion resistance, toughness, chemical resistance, and gloss, they have been used as coatings for aircraft, blast-furnace equipment, oil and gasoline storage tanks, holds of oceangoing tankers, railroad cars, and conveyor equipment. More recently, they have been used for wire coating, seamless floors, and as clear wood varnishes for floor and furniture finishing. Flexible types have even been used as coatings for leather, rubber, and textiles. Other polyurethane products such as foams, elastomers and the like have also found commercial acceptance.

Heretofore, in the preparation of polyurethane products such as foams, elastomers and coatings, several problems have been consistently encountered, not the least of which is the tendency of these products to yellow on exposure to natural and artificial light. This problem is particularly significant in respect to polyurethanes manufactured from aromatic diisocyanates, especially tolylene diisocyanate. In coatings, for example, the problems with light stability compounded with the difficulty of producing polyurethanes which exhibit good weather resistance, elasticity, heat and chemical resistance, abrasion resistance and so on, serve to illustrate the magnitude of the difficulties in preparing suitable products with good and permanent properties.

Furthermore, in coating applications the polyisocyanate adducts become exposed to atmospheric moisture which reacts with the NCO groups of the polyisocyanate adducts. In use, solutions of the adducts are briefly exposed to atmospheric moisture between coating applications. It is necessary that the solutions remain fluid and not gel. It is therefore very important to have polyisocyanate adducts with good solution stability under use conditions. Another highly desirable property of a polyisocyanate adduct to be used in coating applications is its dry-to-touch time or time required for the coating to become nontacky.

The conventional monomeric diisocyanates used in preparing these polyurethanes are volatile and toxic. Consequently these polyurethanes are volatile and toxic. Con those working with these materials. To overcome this problem the monomeric diisocyanates are converted into higher molecular weight nonvolatile products called polyisocyanates. See, for example, U.S. Pats. 3,201,372, 3,284,-479, 3,218,348 and 3,522,304. This is accomplished by forming dimers and trimers of the diisocyanate. The most commonly used method has been the reaction of an excess of the diisocyanate with active hydrogen compounds and the removal of the excess diisocyanates to form nonvolatile polyisocyanate adducts. An excess of the monomeric diisocyanate is used in order to reduce polymer formation.

The polyisocyanate adducts of this invention have an overall combination of outstandingly advantageous properties, e.g., excellent solution stability, yet has rapid dry-to-touch rate. Coatings from these polyisocyanates are nonyellowing and have excellent gloss and excellent gloss retention. Certain adducts described in the prior art, some of which are commercially available, have one or two but not all of these excellent properties. It has been found that polyisocyanate adducts of 1,3- and 1,4-cyclohexanebis(methylisocyanate) and certain specific aminoalcohols are useful in producing polyurethanes having greatly improved properties.

It is therefore an object of this invention to provide novel polyisocyanate adducts having greatly improved properties.

A further object of this invention is to provide polyisocyanate adducts which can be used in the preparation of polyurethane coatings that are light stable, resistant to discoloration and therefore nonyellowing.

A still further object of this invention is to provide polyisocyanate adducts with improved solubility, solution stability as well as improved gelation resistance.

Another object of this invention is to provide novel polyisocyanate adducts which possess a rapid dry rate in coating applications.

Still another object of this invention is to provide polyisocyanate adducts which can be used to prepare polyurethane coatings with improved gloss and weatherability.

Other objects will be apparent from the description and claims which follow.

According to one aspect of this invention, there is provided a polyisocyanate adduct of 1,3-cyclohexanebis(methylisocyanate), 1,4-cyclohexanebis(methylisocyanate) or mixtures thereof, and at least one aminoalcohol having the structure

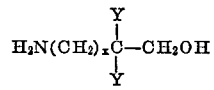

wherein X is 0 or 1 to 8 and Y is an alkyl group containing 1 to 4 carbon atoms, said adduct having an NCO content of at least 8 percent based upon the weight of the adduct. Preferaby the adduct will have an NCO content of at least 12 percent.

Examples of specific aminoalcohols suitable for use in this invention are 2,2-dimethyl-5-amino-1-pentanol,
2,2-dimethyl-2-amino-1-ethanol,
2,2-diethyl-3-amino-1-propanol,
2-ethyl-2-methyl-2-amino-1-ethanol,
2-propyl-2-methyl-3-amino-1-propanol, etc. The preferred aminoalcohols are 2,2-dimethyl-5-amino-1-pentanol and 2,2-dimethyl-2-amino-1-ethanol.

The polyisocyanate adduct of this invention is prepared by heating from about 3 to about 30 mole parts of 1,3- or 1,4-cyclohexanebis(methylisocyanate) with 1 mole part of the aminoalcohol. Preferably 5 to about 20 mole parts of 1,3- or 1,4-cyclohexanebis(methylisocyanate) to one mole part of the aminoalcohol may be used. The reaction is carried out between about −10° C. to about 250° C. preferably 20 to about 200° C. for a period of from about 2 minutes to about 4 hours, optionally with or without a solvent inert to the diisocyanate and aminoalcohol. After the reaction is complete, unreacted monomeric diisocyanate is removed from the polyisocyanate by distillation or solvent extraction.

The polyurethane products prepared by reacting the polyisocyanates of this invention with an active hydrogen containing compound such as water, polyols, aliphatic amines, dicarboxylic acids, etc., exhibit outstanding properties; they are nonyellowing due to their excellent light stability and they possess a high degree of chemical and heat resistance. The weather-ability of these polyurethane products is likewise good, and porous and nonporous polyurethane products which cure to a tack-free state in advantageously short periods are easily obtained. Polyurethane coatings have been formulated which exhibit excellent gloss and gloss retention under extreme conditions. The polyisocyanates of this invention are particularly useful in coating applications in that they exhibit excellent solubility and solution stability. Examples of suitable solvents are toluene, xylene, methylethylketone, ethylacetate and ethoxyethyl acetate. These properties are most important in that solutions of the adducts must be stable (do no gel) in closed containers for extended periods of time and they must remain at a viscosity suitable for painting or spraying while they are being applied. After application, the coatings of this invention rapidly become tack-free. If desired, dyes or dye receptive agents, color stabilizers, whiteners such as titanium dioxide, anti-cratering agents such as cellulose acetate butyrate and various other adjuvants may be included in the coatings prepared from the polyisocyanate adducts of this invention. Such additives would normally be added as such to the coating mixture prior to application.

This invention may be more fully understood by a reference to the following illustrative examples which are intended to describe certain embodiments of this invention. Parts and percentages are by weight and temperatures are in degrees centigrade unless otherwise specified.

NCO Content is determined according to ASTM D1638–70. The preparation of the isocyanates may be carried out by known procedures, i.e., by reacting 1,3- or 1,4-cyclohexanebis(methylamine) with phosgene.

EXAMPLE 1

This example describes a composition of this invention. Using anhydrous glass equipment 5 g. (0.0382 mole) of 2,2-dimethyl-5-amino-1-pentanol is dissolved in 5 g. of anhydrous toluene and added over a period of 10 min. to 55.5 g. (0.286 mole) of vigorously stirred and ice-bath cooled 1,4-cyclohexanebis(methylisocyanate). The cooled reaction is carried out under dry nitrogen. A white precipitate is formed during addition of the aminoalcohol. The ice bath is removed and the reaction is placed in a 100° C. Woods metal bath. With continuous stirring the temperature of the reaction is gradually increased to 190° C. over a period of 1 hr. and 40 min. During this time the precipitate further reacts and a clear light yellow solution is formed. The solution remains clear and fluid on cooling to room temperature.

Under nitrogen ebulation the solution is heated at a reduced pressure to remove unreacted monomeric 1,4-cyclohexanebis(methylisocyanate). Heating is started at 112° C. and increased to 154° C. over a period of 2 hr. and 12 min. at reduced pressures of 0.25–0.30 mm. of mercury. The product solidifies on cooling to room temperature and is found to be readily soluble in toluene, ethylacetate and methylethylketone. The polyisocyanate product has an NCO analysis of 16.1 weight percent. A thin film or coating of the polyisocyanate is cast on a glass slide from methylketone and xylene. After 1 hr. the coating is dry-to-touch.

To test the solution stability of this adduct 1 g. of adduct is dissolved in 1 g. of anhydrous methylethylketone. This solution is exposed to the atmosphere for 1 hr. each day until it will not flow. This solution remains fluid for 22 days and on the 23rd day does not flow. No precipitate formed in the solution at any time.

EXAMPLE 2

To show the improved solution stability of compositions of this invention a polyisocyanate is prepared from a 1:15 mole ratio 2,2-dimethyl-1,3-propanediol and 1,4-cyclohexanebis(methylisocyanate) for comparison with the solution stability of compositions of this invention. Using anhydrous glass equipment 3.0 g. (.0288 mole) of 2,2-dimethyl-1,3-propanediol is reacted with 84 g. (0.433 mole) of 1,4-cyclohexanebis(methylisocyanate) at 105° C. for 1.5 hr. Unreacted monomeric diisocyanate is removed from the polyisocyanate by distillation under reduced pressures of 0.4–0.5 mm. of mercury while raising the temperature from 98° C. to 150° C. over a period of 1 hr. and 10 min. A clear colorless polyisocyanate is obtained which solidifies on cooling. The polyisocyanate contains 16.5 percent NCO and is soluble in methylethylketone. The solution stability of the polyisocyanate is tested as a 50 percent solution in methylethylketone as described in Example 1. A finely divided precipitate forms in the solution after 2 days.

EXAMPLE 3

The solution stability of the adducts from Examples 1 and 2 are compared with the solution stability of two commercial light-stable polyisocyanate adducts. The trade names of the commercial adducts are Desmodur N, manufactured by Farbenfabriken Bayer AG (prepared from hexamethylene diisocyanate and water) and E–268, an experimental adduct manufactured by Mobay Chemical Company. One gram of each of the adducts of Example 1 and 2 are dissolved in 1 g. of methylethylketone. This gives a solution containing 50 percent solids. Desmodur N is sold at about 75 percent solids and is diluted with enough methylethylketone to give 50 percent solids. E–268 is sold at 60 percent solids and is diluted with enough methylethylketone to give 50 percent solids. These solutions are exposed to the atmosphere for 1 hr. each day until they gel or precipitate. The results as shown below show the superior solution stability of the polyisocyanates of this invention.

| Polyisocyanate: | Solution stability, days |
| --- | --- |
| From Example 1 | 22–23 |
| From Example 2 | 1–2 |
| Desmodur N | 9–10 |
| E–268 | 11–12 |

EXAMPLE 4

Commercial polyisocyanates Desmodur N, E–268 and the polyisocyanate of this invention prepared as described in Example 1 are blended in a solvent with a polyesterpolyol in a ratio of 1.1 mole parts of NCO per 1.0 mole part of OH. (The polyesterpolyol is prepared by heating under nitrogen 388.29 g. of trimethylolpropane, 281.84 g. of 2,2-dimethyl-1,3-propanediol, 554.17 g. of isophthalic acid, 243.70 g. of adipic acid and 131.93 g. of pelargonic acid. The temperature is raised from room temperature to 230° C. over a period of 3 hr. and held at 230° C. for 4.18 hr. Water (195 ml.) is collected from the reactions. The polyesterpolyol has an acid number of 8.1 and contains 3.9% hydroxyl.) These coatings are pigmented with 30 percent $TiO_2$, sprayed on metal panels, and allowed to cure. The gloss of these coatings is determined on a Gardner Multiple Angle Gloss Meter before exposure and after 400 hr. exposure in a Weather-Ometer. The results as shown below show the superior gloss and superior gloss retention of coatings prepared using the polyisocyanate of this invention.

|  | Gloss | |
| --- | --- | --- |
| Polyisocyanate | Initial | After 400 hours in Weather-Ometer |
| This invention | 90 | 88 |
| Desmodur N | 85 | 70 |
| E-268 | 86 | 65 |

EXAMPLE 5

To show the improved solution stability of compositions of this invention a polyisocyanate is prepared from 1,6-hexanediisocyanate and 2,2 - dimethyl-5-amino-1-pentanol. Using anhydrous glass equipment 4.04 g. (.0308 mole) of 2,2-dimethyl-5-amino-1-pentanol dissolved in 4.04 g. of toluene was added dropwise over a period of 12 min. to 38.86 g. (0.231 mole) of vigorously stirred 1,6-hexanediisocyanate cooled in an ice bath. The reaction is carried out under nitrogen. A white precipitate forms during addition of the aminoalcohol. The reaction is placed in a 100° C. Woods metal bath. With continuous stirring the temperature of the reaction is gradually increased over a period of 2 hr. During this time the temperature reaches as high as 165° C. and the precipitate further reacts with formation of a clear light yellow solution. The solution remains clear on cooling to room temperature.

To remove unreacted monomeric 1,6-hexanediisocyanate the solution is heated under reduced pressure using nitrogen ebulation. Heating is started at 102° C. and is increased to 170° C. over a period of 3 hr. and 23 min. at pressures of 0.12–0.17 mm. of mercury. A clear light yellow polyisocyanate product is obtained which forms a viscous liquid on cooling. The polyisocyanate contains 16.32 percent NCO. A thin coating of this polyisocyanate was cast on glass from a 50 percent solution in methylethylketone and required 3 days to become dry-to-touch. The solution stability of this polyisocyanate is determined as described in Example 3 using methylethylketone as the solvent and is found to be 15–16 days compared to a solution stability in excess of 20 days for a polyisocyanate of this invention prepared as described in Example 1.

EXAMPLE 6

The procedure of Example 1 is repeated using a 15:1 mole ratio of 1,4-cyclohexanebis(methylisocyanate) to 2,2-dimethyl-5-amino-1-pentanol. Unreacted 1,4-cyclohexanebis(methylisocyanate) is removed by distillation leaving the polyisocyanate. Thin films of the polyisocyanate cast from solution form hard transparent coatings in about one hour.

EXAMPLE 7

The procedure of Example 1 is repeated using a 12.5:1 mole ratio of 1,3-cyclohexanebis(methylisocyanate) to 2,2-dimethyl-5-amino-1-pentanol. Unreacted 1,3-cyclohexanebis(methylisocyanate) is removed by distillation leaving the polyisocyanate. Thin films of the polyisocyanate cast from solution form hard transparent coatings in about one hour.

EXAMPLE 8

This example describes a composition of this invention. The mole ratio of isocyanate to aminoalcohol is 7.5:1. Using anhydrous glass equipment 10.2 g. of 2,2-dimethyl-2-amino-1-ethanol is dissolved in 30.6 g. of anhydrous xylene and added dropwise over a period of 27 min. to 166.5 g. of 1,4-cyclohexanebis(methylisocyanate) held at 110° C. and stirred vigorously. The reaction is carried out under nitrogen. During the addition the isocyanate becomes hazy. With continuous stirring the temperature of the isocyanate-aminoalcohol reaction product is gradually increased from 110° C. to 165° C. over a period of 2 hr. and 42 min. During this time the reaction becomes clear. Heating and stirring are stopped and the product quickly transferred to a nitrogen dry box for filtration while hot. The product is filtered through a filter paper that is washed twice with cyclohexane and dried 4 hr. at 100° C. in an oven and 18 hr. in a nitrogen dry box. About 1 g. of material remains on the filter paper and the filtered product is light yellow. The product is clear and fluid on cooling to room temperature.

Unreacted monomeric 1,4 - cyclohexanebis(methylisocyanate) is removed by heating the product under reduced pressure using nitrogen ebulation. Heating is started at 115° C. and increased to 160° C. over a period of 2 hr. and 10 min. at reduced pressures of 0.09–0.13 mm. of mercury. The polyisocyanate product is light yellow and solidifies on cooling to room temperature. The polyisocyanate product has an NCO analysis of 18.79 weight percent and is readily soluble in methylethylketone.

This polyisocyanate and commercial polyisocyanates Desmodur N and E-268 are blended in a solvent with the polyesterpolyol described in Example 4 using a ratio of 1.1 mole parts of NCO to 1.0 mole part of OH. From the solutions, which contain 50 weight percent solids, solution stability is determined and films are formed to determine the dry-to-touch-time. The results are shown below:

|  | This invention, Example 8 | E-268 | Desmodur N |
| --- | --- | --- | --- |
| Solution viscosity, centipoises: | | | |
| Initial | 137.5 | 325 | 122.5 |
| 2 hrs | 207.5 | Gel | 210.0 |
| 4 hrs | 297.5 |  | 367.5 |
| 6 hrs | 410.0 |  | 950.0 |
| Dry-to-touch-time, min | 65 | 45 | (¹) |

¹ 8–20 hours.

EXAMPLE 9

This example illustrates the problems in attempting to use aminoalcohols such as 2-aminoethanol in place of the aminoalcohols of this invention. The mole ratio of 1,4-cyclohexanebis(methylisocyanate) to 2 - aminoethanol is 7.5:1. Using anhydrous glass equipment and carrying out the reaction under nitrogen 2.64 g. of 2-aminoethanol dissolved in 2.64 g. of anhydrous toluene is added dropwise over a period of 10 min. to 63.08 g. of vigorously stirred 1,4 - cyclohexanebis(methylisocyanate). A white slurry forms in the 1,4-cyclohexanebis(methylisocyanate) during addition of the 2-aminoethanol. This product is placed in a 100° C. Woods metal bath and stirred. The temperature of the bath is increased from 100° C. to 185° C. over a period of 2 hr. and 39 min. During this time the product starts becoming clear and starts foaming near the end of the time. Heating is continued at 180° C. for 22 min. During this time the viscosity of the product increases and appears to be gelling. The product solidifies rapidly on cooling. The product is soluble in 2-butanone but insoluble in xylene. Further heating to remove unreacted monomeric 1,4 - cyclohexanebis(methylisocyanate) increases the viscosity and causes it to gel.

Although the invention has been described in considerable detail with particular reference to certain preferred embodiments thereof, variations and modifications may be effected within the spirit and scope of the invention.

We claim:

1. A polyisocyanate adduct of 1,3 - cyclohexanebis(methylisocyanate), 1,4 - cyclohexanebis(methylisocyanate) or mixtures thereof and at least one aminoalcohol having the structure

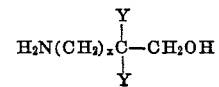

wherein X is 0 or 1 to 8 and Y is an alkyl group containing 1 to 4 carbon atoms, said adduct having an NCO content of at least 8 percent based upon the weight of the adduct.

2. The adduct of claim 1 wherein the NCO content is at least 12 percent.

3. The composition of claim 1 wherein the aminoalcohol is 2,2-dimethyl-5-amino-1-pentanol.

4. The composition of claim 1 wherein the aminoalcohol is 2,2-dimethyl-2-amino-1-ethanol.

References Cited

UNITED STATES PATENTS 3,644,490   2/1972   Schmelzer et al. ____ 260—453 X

LEWIS GOTTS, Primary Examiner

D. H. TORRENCE, Assistant Examiner

U.S. Cl. X.R.

260—25 AT, 77.5 TB, 453 SP, 468 C